US012540571B2

(12) United States Patent
Tanis et al.

(10) Patent No.: US 12,540,571 B2
(45) Date of Patent: Feb. 3, 2026

(54) VARIABLE GEOMETRY TURBOCHARGER (VGT) DURABILITY BY AVOIDING EXCESSIVE FORCE ON ONE OR MORE COMPONENTS OF THE VGT

(71) Applicant: Caterpillar Inc., Peoria, IL (US)

(72) Inventors: Derek Tanis, Peoria, IL (US); Matthew E. Layne, Chillicothe, IL (US); Matthew T. Wolk, Peoria, IL (US); James Mutti, Germantown Hills, IL (US); Kevin Weiss, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 123 days.

(21) Appl. No.: 18/538,878

(22) Filed: Dec. 13, 2023

(65) Prior Publication Data

US 2025/0198326 A1 Jun. 19, 2025

(51) Int. Cl.
*F02B 37/24* (2006.01)
*F01D 17/00* (2006.01)

(52) U.S. Cl.
CPC ............... *F02B 37/24* (2013.01); *F01D 17/00* (2013.01); *F05D 2220/40* (2013.01); *F05D 2260/70* (2013.01); *F05D 2270/20* (2013.01); *F05D 2270/708* (2013.01)

(58) Field of Classification Search
CPC ........ F02B 37/24; F01D 17/00; F01D 17/165; F01D 17/16; F05D 2220/40; F05D 2260/70; F05D 2270/20; F05D 2270/708
See application file for complete search history.

(56) References Cited

U.S. PATENT DOCUMENTS

| 6,546,728 B2* | 4/2003 | Schmidt .................. F01D 17/12 415/164 |
| 7,089,738 B1 | 8/2006 | Boewe et al. |
| 7,779,633 B2 | 8/2010 | Roettger et al. |

(Continued)

FOREIGN PATENT DOCUMENTS

| EP | 2699778 B1 | 4/2015 |
| JP | 2009013963 A | 1/2009 |

OTHER PUBLICATIONS

Sasaki, S., "Control Device of Turbocharger," JPO 2009013963 A, Jan. 22, 2009 (Year: 2009).*

(Continued)

*Primary Examiner* — Nathaniel E Wiehe
*Assistant Examiner* — Joshua R Beebe
(74) *Attorney, Agent, or Firm* — Harrity & Harrity, LLP

(57) ABSTRACT

In some implementations, a controller of a machine may identify an expansion ratio associated with a variable geometry turbocharger (VGT) of the machine. The controller may determine, based on the expansion ratio, wear-reduction information that indicates a force-reduction threshold position of the VGT. The controller may select, based on the wear-reduction information and performance information indicating a desired position of the VGT, an optimized position of the VGT. The controller may cause the VGT to be adjusted to the optimized position. In this way, the controller causes the VGT to operate within a force-related wear-reduction operating range (e.g., that causes the VGT to avoid excessive force being exerted on one or more components of the VGT 214), which improves a durability of the VGT.

20 Claims, 5 Drawing Sheets

(56) References Cited

U.S. PATENT DOCUMENTS

| | | | |
|---|---|---|---|
| 9,482,147 | B2 | 11/2016 | Zhu et al. |
| 9,822,697 | B2 | 11/2017 | Ge et al. |
| 10,895,207 | B2 | 1/2021 | Dixon et al. |
| 11,053,872 | B2 | 7/2021 | Dixon et al. |
| 2002/0023438 | A1* | 2/2002 | Schmidt .................. F02B 37/24 |
| | | | 415/164 |
| 2009/0094979 | A1 | 4/2009 | Eissler et al. |
| 2021/0285365 | A1 | 9/2021 | Ishimasa |
| 2022/0364486 | A1* | 11/2022 | Frazier ................ F01L 13/0005 |
| 2023/0272737 | A1* | 8/2023 | Blythe .................... F02B 37/10 |
| | | | 60/773 |

OTHER PUBLICATIONS

European Patent Office Search Report for EP Patent Application No. 24213132.4-1009, mailed Apr. 4, 2025 (08 pgs).

\* cited by examiner

VARIABLE GEOMETRY TURBOCHARGER (VGT) DURABILITY BY AVOIDING EXCESSIVE FORCE ON ONE OR MORE COMPONENTS OF THE VGT

TECHNICAL FIELD

The present disclosure relates to a variable geometry turbocharger (VGT) and, for example, to improving VGT durability by avoiding excessive force on one or more components of the VGT.

BACKGROUND

A VGT is a type of turbocharger with an adjustable geometry that can be used in a machine to facilitate an optimized performance of the machine. For example, one or more components of the VGT can adjust to control a flow and/or pressure of exhaust gas flowing through the VGT, which enables improved efficiency, enhanced power output, and better response in the machine. Over an operable life of the VGT, the one or more components of the VGT are subject to wear, such as due to movement of the one or more components (e.g., between different positions). Notably, the one or more components of the VGT are subject to increased wear when a force associated with the flow of the exhaust is "high" (e.g., due to a "high" pressure of the exhaust gas flowing through the VGT and/or a "closed" or "partly closed" geometry of the VGT). This increased wear affects a durability of the one or more components, which decreases a performance of the VGT, and ultimately leads to failure of the one or more components and therefore failure of the VGT. Consequently, there is a need for a control strategy for the VGT that allows for the VGT to provide an optimized performance of the machine and that also avoids excessive force on the one or more components of the VGT (e.g., to reduce an amount of force-related wear of the one or more components due to movement of the one or more components, and thereby to improve durability of the one or more components of the VGT and to avoid failure of the VGT).

U.S. Pat. No. 9,482,147 (the '147 patent) discloses a compressor boost control scheme for controlling intake pressure at an internal combustion engine. The compressor boost control scheme is configured to determine a compressor boost control command for an intake air compressor based upon an intake manifold absolute pressure and an exhaust gas pressure upstream of the intake air compressor. The '147 patent further discloses that the compressor boost control is accomplished through VGT position control. The compressor boost control scheme serves to prevent the engine from excessive peak cylinder pressure by limiting exhaust pressure and maintaining integrity of lubricating and cooling seals in a turbine of the VGT, which has a secondary effect of protecting downstream catalytic converter element(s) from oil-induced poisoning.

While the '147 patent discloses some benefits associated with the compressor boost control scheme, the present disclosure is associated with a controller controlling a VGT of an engine by monitoring an expansion ratio associated with the VGT, and determining whether to cause adjustment of the VGT to avoid excessive force on one or more components of the VGT. This allows for the VGT to provide an optimized performance and improves a durability of one or more components of the VGT (e.g., by reducing an amount of force-related wear of the one or more components due to movement of the one or more components).

The controller of the present disclosure solves one or more of the problems set forth above and/or other problems in the art.

SUMMARY

Some aspects described herein relate to a machine comprising: a variable geometry turbocharger (VGT); and a controller configured to: identify a first expansion ratio associated with the VGT; determine, based on the first expansion ratio, first wear-reduction information that indicates a first force-reduction threshold position of the VGT; obtain first performance information indicating a first desired position of the VGT; select, based on the first wear-reduction information and the first performance information, a first optimized position of the VGT from the first force-reduction threshold position of the VGT and the first desired position of the VGT; cause the VGT to be adjusted to the first optimized position; identify, based on causing the VGT to be adjusted to the first optimized position, a second expansion ratio associated with the VGT; determine, based on the second expansion ratio, second wear-reduction information that indicates a second force-reduction threshold position of the VGT; obtain second performance information indicating a second desired position of the VGT; select, based on the second wear-reduction information and the second performance information, a second optimized position of the VGT from the second force-reduction threshold position of the VGT and the second desired position of the VGT; and cause the VGT to be adjusted to the second optimized position.

Some aspects described herein relate to a controller of a machine includes one or more memories; and one or more processors configured to: identify a first expansion ratio associated with a VGT of the machine; determine, based on the first expansion ratio, first wear-reduction information that indicates a first force-reduction threshold position of the VGT; select, based on the first wear-reduction information and first performance information indicating a first desired position of the VGT, a first optimized position of the VGT; cause the VGT to be adjusted to the first optimized position; identify a second expansion ratio associated with the VGT; determine, based on the second expansion ratio, second wear-reduction information that indicates a second force-reduction threshold position of the VGT; select, based on the second wear-reduction information and second performance information indicating a second desired position of the VGT, a second optimized position of the VGT; and cause the VGT to be adjusted to the second optimized position.

Some aspects described herein relate to a method that includes identifying, by a controller of a machine, a first expansion ratio associated with a VGT of the machine; determining, by the controller and based on the first expansion ratio, first wear-reduction information that indicates a first force-reduction threshold position of the VGT; selecting, by the controller and based on the first wear-reduction information and first performance information indicating a first desired position of the VGT, a first optimized position of the VGT; and causing, by the controller, the VGT to be adjusted to the first optimized position.

DETAILED DESCRIPTION

This disclosure relates to a controller, such as an engine control module (ECM), controlling a VGT, such as by causing adjustment of the VGT to avoid excessive force on one or more components of the VGT (to thereby reduce an amount of force-related wear of the one or more components due to movement of the one or more components). The controller and the VGT, as described herein, have universal applicability to any machine utilizing such a controller and VGT. The term "machine" may refer to a vehicle, any machine that performs an operation associated with an industry such as, for example, mining, construction, farming, transportation, or any other industry, and any other machine that includes a VGT. As some examples, the machine may be an automobile (e.g., a passenger car, a truck, or another vehicle), an off-highway truck, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a pump, a power generation set (e.g., a "genset"), stationary equipment, non-stationary equipment, or other aboveground equipment, underground equipment, aerial equipment, or marine equipment.

Figure 1:
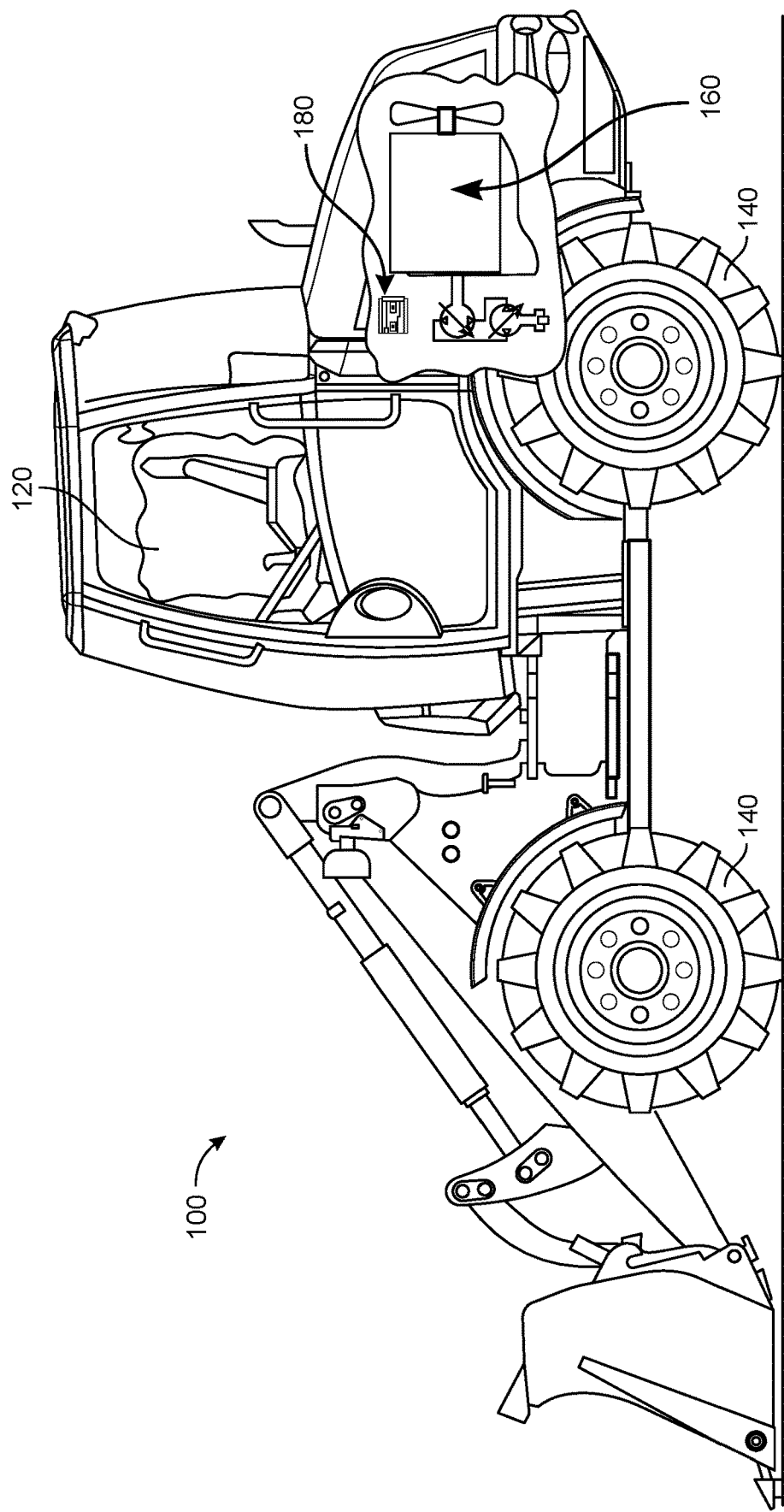
FIG. 1 is a diagram of an example machine described herein.

FIG. 1 is a diagram of an example machine 100 described herein. For example, machine 100 may include a mobile machine, such as the wheel loader shown in FIG. 1, or any other type of mobile machine. Machine 100 may include an operator station 120, one or more traction devices 140 (sometimes referred to as ground engagements), a power source 160 operatively connected to provide power to drive at least one of traction devices 140, and a controller 180 (e.g., an ECM) connected to one or more components of machine 100. The controller 180 may perform operations related to controlling a VGT of the power source 160, as described in more detail elsewhere herein.

As indicated above, FIG. 1 is provided as an example. Other examples may differ from what is described in connection with FIG. 1.

Figure 2:
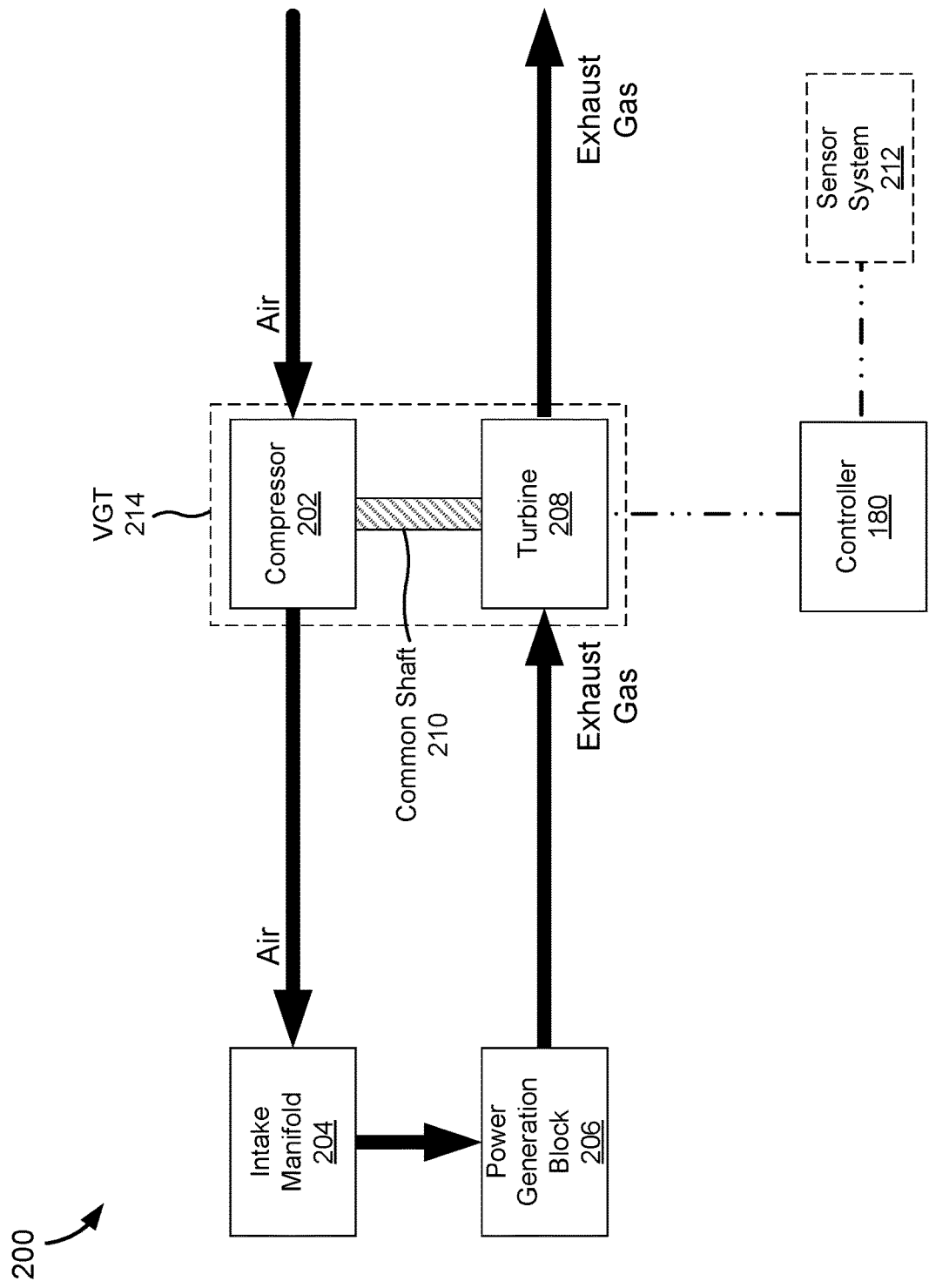
FIG. 2 is a diagram of an example power system described herein.

FIG. 2 is a diagram of an example power system 200 described herein, which may be included in the power source 160. The power system 200 may be, or may include, a compression ignition, an internal combustion engine, another type of combustion engine, a fuel cell, and/or another type of energy conversion device. The power system 200 may be fueled by such fuels as gasoline, distillate diesel fuel, biodiesel, dimethyl ether, gaseous fuels (such as hydrogen, natural gas, and propane), alcohol, ethanol, and/or any combination thereof. As shown in FIG. 2, the power system 200 may include a compressor 202, an intake manifold 204, a power generation block 206, a turbine 208, a common shaft 210, a sensor system 212, the controller 180, and/or one or more other components (not shown). Together, the compressor 202, the turbine 208, and the common shaft 210 form a VGT 214, as further described herein.

As further shown in FIG. 2, air (e.g., ambient air from an environment external to the power system 200) may be introduced into the power system 200, such as via the compressor 202. In some implementations, an exhaust gas (e.g., produced by the power generation block 206 of the power system 200) may be provided to the compressor 202 (e.g., via an exhaust gas recirculation (EGR) system, not shown), and therefore the compressor 202 may introduce air and the exhaust gas into the power system 200. The compressor 202 may pressurize and provide the air (or the air and the exhaust gas) to the intake manifold 204. The intake manifold 204 may mix and distribute the air (or the air and the exhaust gas) to the power generation block 206 for use in a subsequent power production process (e.g., to generate and provide power to drive at least one of traction devices 140 of the machine 100).

As part of the power production process, the power generation block 206 produces an exhaust gas that flows from the power generation block 206. For example, when the power generation block 206 includes a plurality of cylinders (e.g., six or more cylinders), the plurality of cylinders may produce an exhaust gas as a result of a combustion process. The exhaust gas may flow to the turbine 208. A portion of the exhaust gas may be provided to the compressor 202 (e.g., via the EGR system).

The turbine 208 may be located to receive the exhaust gas from the power generation block 206 and may be connected to the compressor 202 via the common shaft 210. As the exhaust gas flows through the turbine 208 and expands against vanes (and/or other components) thereof, the turbine 208 may rotate and drive the compressor 202 to pressurize air (or air and exhaust gas).

The turbine 208, the compressor 202, and the common shaft 210 may form the VGT 214. That is, the VGT 214 may include an assembly that comprises the turbine 208, the compressor 202, and the common shaft 210 (e.g., where the turbine 208 and the compressor 202 are connected to the common shaft 210 via respective wheels), which is sometime referred to as a "shaft and wheel" assembly. The turbine 208 may be a variable geometry turbine that includes one or more adjustable components, such as one or more adjustable vanes, an adjustable intake, an adjustable outtake, and/or an adjustable flow area control element, each of which may be adjusted to alter a performance of the VGT 214. For example, the one or more adjustable vanes may be extended to a "closed" position or may be retracted to an "open" position or a "partially open" position, which may control how much the common shaft 210 rotates and may therefore cause more or less of the energy from the flow of the exhaust gas to be transferred to the compressor 202 (e.g., via the common shaft 210). This may cause the compressor 202 to modify (e.g., increase or decrease) a flow of air (and/or a flow of air and exhaust gas) to the intake manifold 204. This, in turn, modifies (e.g., increases or decreases) a flow of exhaust gas through the VGT 214, which modifies (e.g., increases or decreases) a speed of the VGT 214 (e.g., a speed of the shaft and wheel assembly of the VGT 214, a speed at which the turbine 208 rotates on the common shaft 210, and/or another speed associated with the VGT 214).

Over an operable life of the VGT 214, the one or more adjustable components of the VGT 214 are subject to wear, such as due to movement of the one or more adjustable components. For example, the one or more adjustable vanes are subject to wear due to moving between closed, open, and partially open positions. Further, a greater a force of the flow of exhaust gas (e.g., that is based on an expansion ratio associated with the VGT 214 and/or a position of the one or more adjustable components) that is exerted on the one or more adjustable components when the one or more adjustable components move, a greater an amount of wear of the one or more adjustable components. Accordingly, a durability of the one or more adjustable components of the VGT 214 is reduced when the one or more components move while subject to excessive force, which decreases a performance of the VGT 214, and ultimately leads to failure of the one or more adjustable components and therefore failure of the VGT 214. Accordingly, it is important to control the VGT 214 (e.g., control movement, or adjustment, of the one or more adjustable components) to reduce an amount of force exerted on the one or more adjustable components and to thereby reduce an amount of force-related wear of the one or more adjustable components. This improves the durability of the one or more adjustable components, which reduces a likelihood of impaired performance of the power system 200 and/or components of the power system 200 that would be affected by a failure of the VGT 214.

The controller 180, as described further herein, may provide control of the power system 200 and/or components of the power system 200, such as the VGT 214. The controller 180 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The controller 180 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the controller 180. The controller 180 may include a memory (e.g., a non-transitory computer-readable medium) capable of storing instructions that, when executed, cause the processor to perform one or more processes and/or methods described herein.

The sensor system 212 may provide measurements associated with various parameters used by the controller 180 to enable control of the power system 200 and/or components of the power system 200. The sensor system 212 may include physical sensors and/or any appropriate type of control system that generates values of sensing parameters based on a computational model and/or one or more measured parameters. As used herein, "sensing parameters" may refer to measurement parameters that are directly measured and/or estimated by one or more sensors (e.g., physical sensors, virtual sensors, and/or other sensors). Example sensors may include temperature sensors (e.g., to measure a temperature of an oil of the engine of the power system 200), speed sensors (e.g., to measure a speed of the engine of power system 200 and/or a speed of the VGT 214, such as in terms of revolutions per minute (RPM)), position sensors (e.g., to measure respective positions of one or more components, such as one or more vanes of the turbine 208, of the VGT 214), pressure sensors (e.g., to measure a pressure, such as an intake manifold absolute pressure (IMAP) associated with the intake manifold 204, an inlet pressure associated with the VGT 214, and/or an outlet pressure associated with the VGT 214), engine airflow sensors (e.g., to measure an engine airflow rate, such as in terms of cubic meters per minute, cubic feet per minute, and/or the like), a VGT expansion ratio sensor (e.g., to measure an expansion ratio associated with the VGT 214, which may be based on the inlet pressure associated with the VGT 214 and the outlet pressure associated with the VGT 214), and/or other sensors. Sensing parameters may also include any output parameters that may be measured indirectly by physical sensors and/or calculated based on readings of physical sensors.

As indicated above, FIG. 2 is provided as an example. Other examples may differ from what is described in connection with FIG. 2.

Figure 3:
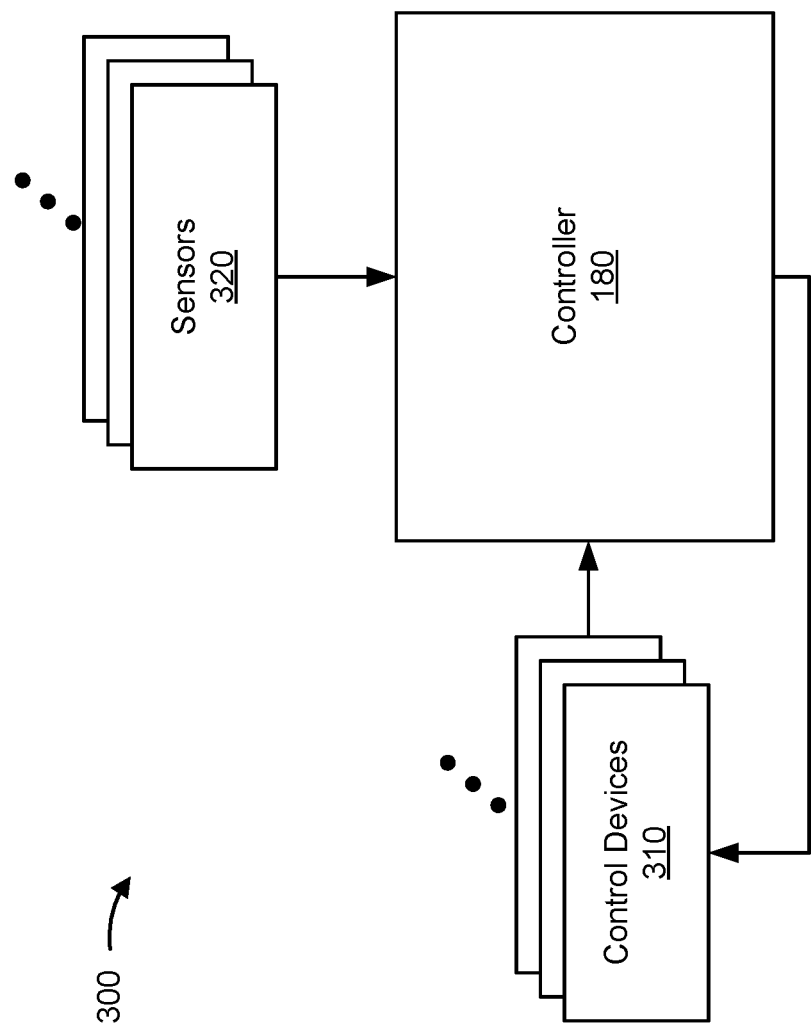
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more control devices 310 (referred to individually as "control device 310" and collectively as "control devices 310"), one or more sensors 320 (referred to individually as "sensor 320" and collectively as "sensors 320"), and the controller 180. Devices and/or components of environment 300 may interconnect via wired connections, wireless connections, or a combination of wired and wireless connections.

A control device 310 may be any type of device that may be used by the controller 180 to control a performance feature of the power system 200. For example, the control device 310 may include one or more actuators, switches, and/or the like that are capable of controlling a component of the power system 200. The control device 310 may be capable of causing adjustment of one or more adjustable components of the VGT 214, such as one or more adjustable vanes of the turbine 208 of the VGT 214 (e.g., from a first vane position to a second vane position). The sensors 320 may include any type of sensor configured to measure operating conditions of the power system 200. The sensors 320 may be sensors of the sensor system 212, as described herein.

The controller 180 may include one or more devices configured to control one or more components of the power system 200. For example, the controller 180 may be configured to control the VGT 214, such as to change (e.g., to control) a flow of exhaust gas through the VGT 214 and/or a pressure of the exhaust gas that is exerted on the one or more adjustable components of the VGT 214, among other examples. The controller 180 may control the one or more components of the power system 200 by sending one or more commands to the one or more control devices 310.

The controller 180 may obtain information concerning the power system 200 from the sensors 320 (e.g., directly from the sensors 320 or via one or more other components or devices of the power system 200, such as a different controller). For example, the controller 180 may obtain information concerning a speed of an engine of the power system 200, information concerning an oil temperature of the engine of the power system 200, information concerning a setting of the VGT 214 (e.g., an "open" setting, a "closed" setting, a "partially open" setting, and/or a "partially closed" setting, that indicates a position of at least one component, such as at least one adjustable vane, of the turbine 208 of the VGT 214), information concerning one or more pressures associated with the VGT 214 (e.g., an inlet pressure associated with the VGT 214 and/or an outlet pressure associated with the VGT 214), information concerning an expansion ratio associated with the VGT 214, and/or information concerning a speed of the VGT 214 (e.g., a speed of the turbine 208 of the VGT 214), among other examples. The controller 180 may obtain the information concerning the power system 200 based on operation of the machine 100.

That is, the controller 180 may obtain the information when the machine is operating (e.g., the machine is powered on and operational).

In some implementations, the controller 180 may cause the VGT 214 to operate within a force-related wear-reduction operating range (further described herein in relation to FIG. 4) of the VGT 214. That is, the controller 180 may cause the VGT 214 to operate such that an amount of force that is exerted on the one or more adjustable components of the VGT 214 (e.g., due a position of the one or more adjustable components) is reduced (e.g., is less than or equal to a maximum force that is allowed to be exerted on the one or more adjustable components of the VGT 214). This thereby reduces an amount of force-related wear of the one or more adjustable components that results from movement of the one or more adjustable components, and therefore increases a durability of the one or more adjustable components.

To cause the VGT 214 to operate within the force-related wear-reduction operating range, the controller 180 may identify a first expansion ratio associated with the VGT 214. For example, the VGT 214 may obtain information (e.g., information concerning the one or more pressures associated with the VGT 214 or information concerning the expansion ratio associated with the VGT 214) from the sensors 320, and may process (e.g., parse, read, and/or analyze) the information to identify the first expansion ratio associated with the VGT 214. Accordingly, the controller 180 may directly identify the first expansion ratio (e.g., by calculating the first expansion ratio based on the inlet pressure associated with the VGT 214 and/or the outlet pressure associated with the VGT 214 that are included in the information concerning the one or more pressures associated with the VGT 214), or, alternatively, may indirectly identify the first expansion ratio (e.g., by identifying the expansion ratio associated with the VGT 214 included in the information concerning the expansion ratio associated with the VGT 214).

The controller 180 may determine first wear-protection information associated with the VGT 214 (e.g., based on the first expansion ratio associated with the VGT 214). The first wear-protection information may indicate a first force-reduction threshold position of the VGT 214. The first force-reduction threshold position may be a position of the VGT 214 that is associated with the maximum force that is allowed to be exerted on the one or more adjustable components of the VGT 214. That is, the first force reduction threshold position may be a position that enables a reduction of an amount of force-related wear of the one or more adjustable components. For example, when "lower" positions of the VGT 214 are associated with "closed" or "partly closed" positions (as compared to "higher" positions of the VGT 214 that are associated with "open" or "partly open" positions of the VGT 214), the first force-reduction threshold position may be a minimum position of the VGT 214 (e.g., that is associated with a maximum "closed amount" of the VGT 214) that causes the force exerted on the one or more adjustable components to be less than or equal to the maximum force.

The controller 180 may determine the first force-reduction threshold position based on the first expansion ratio associated with the VGT 214. For example, the controller 180 may process the first expansion ratio (e.g., by performing one or more operations) to determine the first force-reduction threshold position (e.g., because the first force-reduction threshold may be a function of, or may have a relationship with, the first expansion ratio). As another example, the controller 180 may search a lookup table (or another type of data structure), based on the first expansion ratio, to determine the first force-reduction threshold position.

In some implementations, the controller 180 may obtain first performance information, such as from the sensors 320 or another controller of the machine 100. The first performance information may indicate a first desired position for the VGT 214 (e.g., a position at which the one or more adjustable components are to move to provide a desired performance by the VGT 214). The first desired position may be a position of the VGT 214 that is associated with a desired power output or response (e.g., for the power system 200) that is to be provided by the VGT 214 (e.g., without consideration of an amount of force exerted on the one or more adjustable components of the VGT 214). Accordingly, the controller 180 may process (e.g., read, parse, and/or analyze) the first performance information to identify the first desired position for the VGT 214.

The controller 180 may determine a first optimized position for the VGT 214 (e.g., based on the first wear-reduction information and the first performance information). For example, the controller 180 may select the first optimized position from the first force-reduction threshold position of the VGT 214 (e.g., indicated by the first wear-reduction information) and the first desired position of the VGT 214 (e.g., indicated by the first performance information). When "lower" positions of the VGT 214 are associated with "closed" or "partly closed" positions (as compared to "higher" positions of the VGT 214 that are associated with "open" or "partly open" positions of the VGT 214), the controller 180 may select the first optimized position of the VGT 214 as a minimum of the first force-reduction threshold position of the VGT 214 and the first desired position of the VGT 214.

Accordingly, the controller 180 may cause the VGT 214 to be adjusted to the first optimized position. For example, the controller 180 may communicate (e.g., send one or more control signals) to the one or more control devices 310 to cause the one or more adjustable components of the VGT 214 to move to (or to remain at) the first optimized position. In this way, the controller 180 may adjust the VGT 214 in a manner that avoids excessive force on the one or more adjustable components of the VGT 214 (e.g., avoids a force that is greater than the maximum force that is allowed to be exerted on the one or more adjustable components of the VGT 214) and that allows the VGT 214 to provide a desired (or near-desired) performance. For example, the controller 180 causing the VGT 214 to be adjusted to the first optimized position causes a first force on the one or more adjustable components of the VGT 214 to be less than or equal to a threshold force (e.g., the maximum force that is allowed to be exerted on the one or more adjustable components of the VGT 214).

In some implementations, the controller 180 may further cause the VGT 214 to operate within the force-related wear-reduction operating range (e.g., after, or based on, causing the VGT 214 to be adjusted to the first optimized position). To do so, the controller 180 may identify a second expansion ratio associated with the VGT 214. For example, the VGT 214 may obtain additional information (e.g., additional information concerning the one or more pressures associated with the VGT 214 or additional information concerning the expansion ratio associated with the VGT 214) from the sensors 320, and may process (e.g., parse, read, and/or analyze) the additional information to identify the second expansion ratio associated with the VGT 214. Accordingly, the controller 180 may directly identify the second expansion ratio (e.g., by calculating the second expansion ratio based on the inlet pressure associated with the VGT 214 and/or the outlet pressure associated with the VGT 214 that are included in the additional information concerning the one or more pressures associated with the VGT 214), or, alternatively, may indirectly identify the second expansion ratio (e.g., by identifying the expansion ratio associated with the VGT 214 included in the additional information concerning the expansion ratio associated with the VGT 214).

The controller 180 may determine second wear-protection information associated with the VGT 214 (e.g., based on the second expansion ratio associated with the VGT 214). The second wear-protection information may indicate a second force-reduction threshold position of the VGT 214. The second force-reduction threshold position may be a position of the VGT 214 that is associated with the maximum force that is allowed to be exerted on the one or more adjustable components of the VGT 214. That is, the second force reduction threshold position may be a position that enables a reduction of an amount of force-related wear of the one or more adjustable components. For example, when "lower" positions of the VGT 214 are associated with "closed" or "partly closed" positions (as compared to "higher" positions of the VGT 214 that are associated with "open" or "partly open" positions of the VGT 214), the second force-reduction threshold position may be a minimum position of the VGT 214 (e.g., that is associated with a maximum "closed amount" of the VGT 214) that causes the force exerted on the one or more adjustable components to be less than or equal to the maximum force.

The controller 180 may determine the second force-reduction threshold position based on the second expansion ratio associated with the VGT 214. For example, the controller 180 may process the second expansion ratio (e.g., by performing one or more operations) to determine the second force-reduction threshold position (e.g., because the second force-reduction threshold may be a function of, or may have a relationship with, the second expansion ratio). As another example, the controller 180 may search the lookup table, based on the second expansion ratio, to determine the second force-reduction threshold position.

In some implementations, the controller 180 may obtain second performance information, such as from the sensors 320 or another controller of the machine 100. The second performance information may indicate a second desired position for the VGT 214 (e.g., another position at which the one or more adjustable components are to move to provide a desired performance by the VGT 214). The second desired position may be a position of the VGT 214 that is associated with another desired power output or response (e.g., for the power system 200) that is to be provided by the VGT 214 (e.g., without consideration of an amount of force exerted on the one or more adjustable components of the VGT 214). Accordingly, the controller 180 may process (e.g., read, parse, and/or analyze) the second performance information to identify the second desired position for the VGT 214.

The controller 180 may determine a second optimized position for the VGT 214 (e.g., based on the second wear-reduction information and the second performance information). For example, the controller 180 may select the second optimized position from the second force-reduction threshold position of the VGT 214 (e.g., indicated by the second wear-reduction information) and the second desired position of the VGT 214 (e.g., indicated by the second performance information). When "lower" positions of the VGT 214 are associated with "closed" or "partly closed" positions (as compared to "higher" positions of the VGT 214 that are associated with "open" or "partly open" positions of the VGT 214), the controller 180 may select the second optimized position of the VGT 214 as a minimum of the second force-reduction threshold position of the VGT 214 and the second desired position of the VGT 214.

Accordingly, the controller 180 may cause the VGT 214 to be adjusted to the second optimized position. For example, the controller 180 may communicate (e.g., send one or more control signals) to the one or more control devices 310 to cause the one or more adjustable components of the VGT 214 to move to (or to remain at) the second optimized position. In this way, the controller 180 may adjust the VGT 214 in a manner that avoids excessive force on the one or more adjustable components of the VGT 214 (e.g., avoids a force that is greater than the maximum force that is allowed to be exerted on the one or more adjustable components of the VGT 214) and that allows the VGT 214 to provide a desired (or near-desired) performance. For example, the controller 180 causing the VGT 214 to be adjusted to the second optimized position causes a second force on the one or more adjustable components of the VGT 214 to be less than or equal to a threshold force (e.g., the maximum force that is allowed to be exerted on the one or more adjustable components of the VGT 214).

In this way, in a similar manner as that described above, the controller 180 may continually cause the VGT 214 to operate within the force-related wear reduction operating range. For example, the controller 180 causing the VGT 214 to be adjusted to an optimized position (e.g., the first optimized position or the second optimized position described herein), causes a force to be exerted on the one or more adjustable components of the VGT 214 that is within the force-related wear reduction operating range. Additionally, in this way, the controller 180 may cause the VGT 214 to not operate within a force-related wear-increase operating range (e.g., as further described herein in relation to FIG. 4).

As indicated above, FIG. 3 is provided as an example. Other examples may differ from what is described in connection with FIG. 3.

Figure 4:
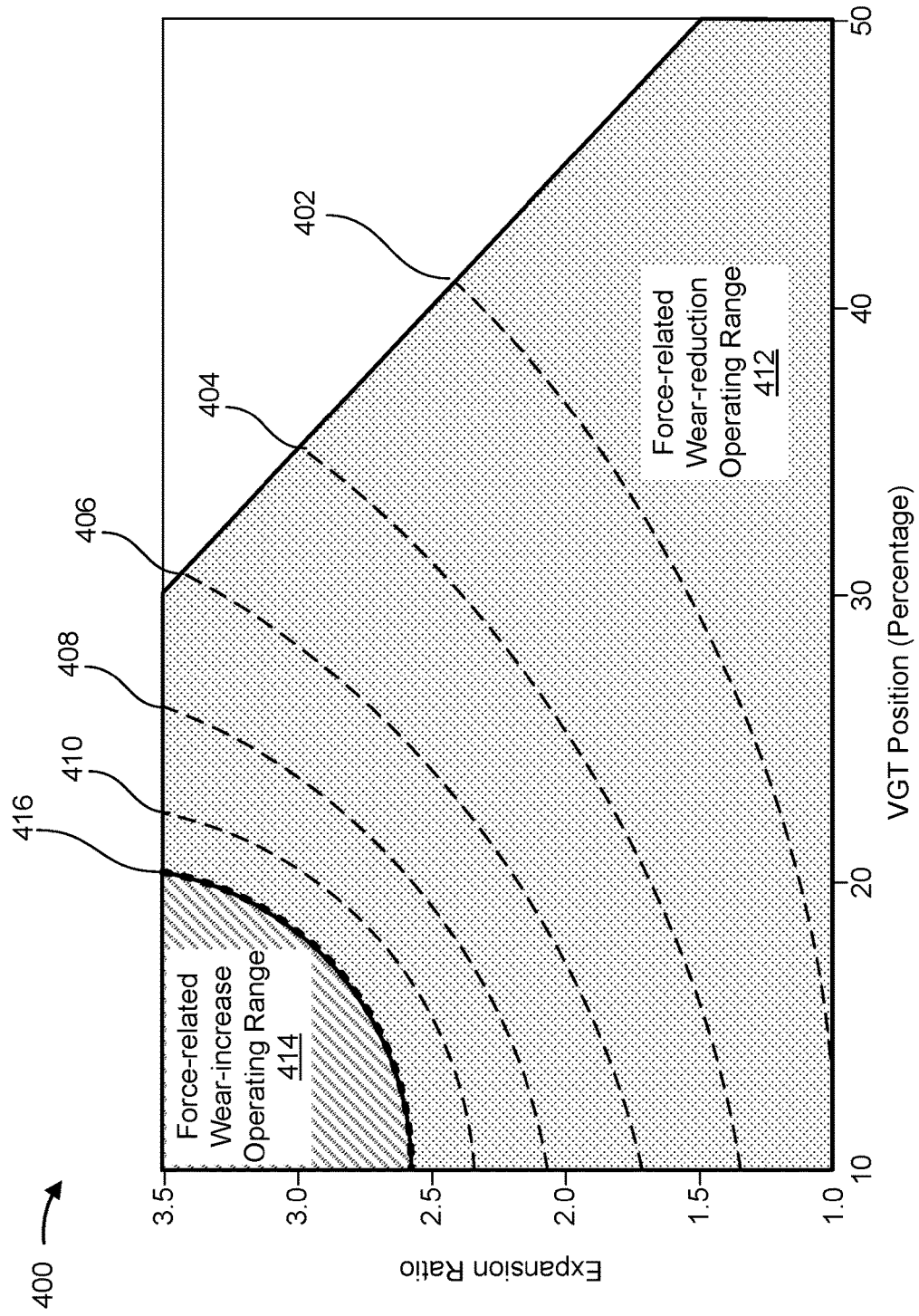
FIG. 4 is a diagram of an example plot associated with a force exerted on the one or more adjustable components of a VGT.

FIG. 4 is a diagram of an example plot 400 associated with a force (e.g., in newtons (N), or another force measurement) exerted on the one or more adjustable components of the VGT 214. As shown in FIG. 4, the force exerted on the one or more adjustable components of the VGT 214 may be based on the expansion ratio associated with the VGT 214, shown as ranging from 1.0 to 3.5, and the position of the VGT 214, shown as position percentages ranging from 10 to 50. A position percentage indicates how "open" the VGT 214 is. For example, a 10 position percentage indicates that the VGT 214 is 10% open (e.g., the VGT 214 is in a "mostly closed" position) and a 50 position percentage indicates that the VGT 214 is 50% open. Example forces exerted on the one or more adjustable components of the VGT 214 are indicated by curves 402, 404, 406, 408, and 410, where a force associated with curve 402 is less than a force associated with curve 404, which is less than a force associated with curve 406, which is less than a force associated with curve 408, which is less than a force associated with curve 410. In general, plot 400 shows that the force exerted on the one or more adjustable components of the VGT 214 increases as the expansion ratio associated with the VGT 214 increases and the position of the VGT 214 closes.

As further shown in FIG. 4, the example plot 400 includes a force-related wear-reduction operating range 412 and a force-related wear-increase operating range 414. The force-related wear-reduction operating range 412 may include combinations of expansion ratios associated with the VGT 214 and positions of the VGT 214 that cause a force exerted on the one or more adjustable components of the VGT 214 to be less than or equal to a maximum force 416 (e.g., a maximum force that is allowed to be exerted on the one or more adjustable components, such as to enable a reduction of an amount of force-related wear of the one or more adjustable components). In contrast, the force-related wear-increase operating range 414 may include combinations of expansion ratios associated with the VGT 214 and positions of the VGT 214 that cause a force exerted on the one or more adjustable components of the VGT 214 to be greater than the maximum force 416.

Accordingly, as described herein, the controller 180 may cause the VGT 214 to operate within the force-related wear-reduction operating range 412 (e.g., may cause the VGT 214 to be adjusted to positions that prevent a force exerted on the one or more adjustable components of the VGT 214 from being greater than the maximum force 416). Put another way, the controller 180 may cause the VGT 214 to not operate within the force-related wear-increase operating range 414 (e.g., to prevent a force exerted on the one or more adjustable components of the VGT 214 from being greater than the maximum force 416). That is, the controller 180 may prevent the VGT 214 from operating within the force-related wear-increase operating range 414.

As indicated above, FIG. 4 is provided as an example. Other examples may differ from what is described in connection with FIG. 4.

Figure 5:
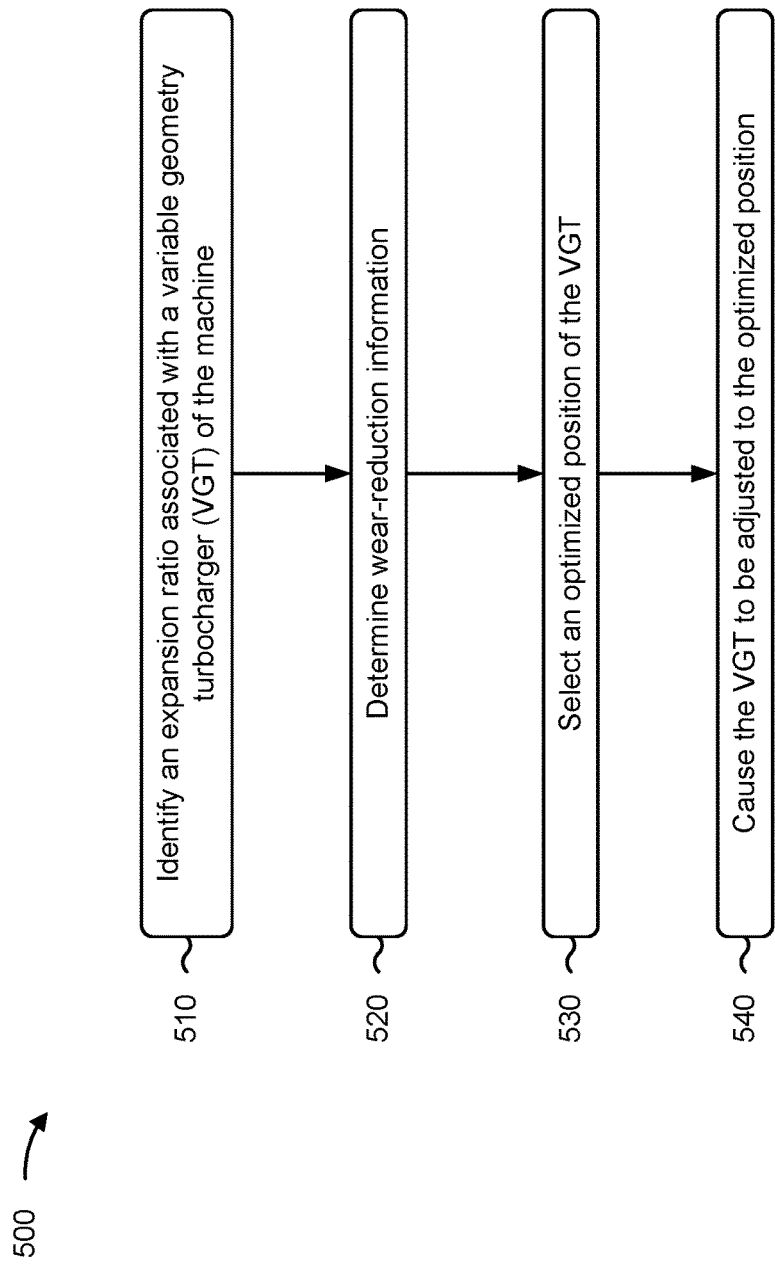
FIG. 5 is a flowchart of an example process associated with control of a VGT.

FIG. 5 is a flowchart of an example process 500 associated with control of a VGT. One or more process blocks of FIG. 5 may be performed by a controller (e.g., the controller 180) of a machine (e.g., the machine 100). Additionally, or alternatively, one or more process blocks of FIG. 5 may be performed by another device or a group of devices separate from or including the controller, such as another device or component that is internal or external to the machine.

As shown in FIG. 5, process 500 may include identifying an expansion ratio associated with a VGT of the machine (block 510). For example, the controller may identify an expansion ratio associated with a VGT of the machine, as described above.

As further shown in FIG. 5, process 500 may include determining wear-reduction information (block 520). For example, the controller may determine, based on the expansion ratio, wear-reduction information that indicates a force-reduction threshold position of the VGT, as described above.

As further shown in FIG. 5, process 500 may include selecting an optimized position of the VGT (block 530). For example, the controller may select, based on the wear-reduction information and performance information indicating a desired position of the VGT, an optimized position of the VGT, as described above.

As further shown in FIG. 5, process 500 may include causing the VGT to be adjusted to the optimized position (block 540). For example, the controller may cause the VGT to be adjusted to the optimized position, as described above. In some implementations, causing the VGT to be adjusted to the first optimized position causes the VGT to operate within a force-related wear-reduction operating range and/or to not operate within a force-related wear-increase operating range.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The above-described techniques allow a controller 180 of a machine 100 to control a VGT 214 (e.g., to control one or more adjustable components of the VGT 214) that is associated with a power source 160, which may include a power system 200. The controller 180 causes the VGT 214 to operate within a force-related wear-reduction operating range 412. For example, the controller 180 identifies an expansion ratio associated with the VGT 214 and thereby determines wear-reduction information that indicates a force-reduction threshold position of the VGT 214. The controller 180 also obtains performance information indicating a desired position of the VGT 214. The controller 180 then selects, from the force-reduction threshold position and the desired position, an optimized position of the VGT 214 (e.g., a position that is within the force-related wear-reduction operating range 412 and that allows the VGT 214 to provide a desired, or near-desired, performance), and causes the VGT 214 to be adjusted to the optimized position.

In this way, by causing the VGT 214 to operate within the force-related wear-reduction operating range 412, the controller 180 adjusts (e.g., continually adjusts) the VGT 214 in a manner that avoids excessive force on the one or more adjustable components of the VGT 214 (e.g., avoids a force that is greater than a maximum force that is allowed to be exerted on the one or more adjustable components of the VGT 214) and that allows the VGT 214 to provide a desired (or near-desired) performance. Further, by avoiding excessive force on the one or more adjustable components of the VGT 214, the controller 180 reduces an amount of force-related wear of the one or more adjustable components that would otherwise result from movement of the one or more adjustable components. This thereby improves a durability of the one or more adjustable components and reduces a likelihood of failure of the VGT 214, which reduces a likelihood of impaired performance of the power system 200, the power source 160, and/or the machine 100 due to a failure of the VGT 214.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A machine comprising:
a variable geometry turbocharger (VGT);
and a controller configured to:
identify a first expansion ratio associated with the VGT;
determine, based on the first expansion ratio, first wear-reduction information that indicates a first force-reduction threshold position of the VGT;
obtain first performance information indicating a first desired position of the VGT;
select, based on the first wear-reduction information and the first performance information, a first position of the VGT by selecting the first force-reduction threshold position of the VGT and not the first desired position of the VGT when the first desired position of the VGT is associated with a force that exceeds a maximum force that is allowed to be exerted on one or more components of the VGT;
cause the VGT to be adjusted to the first position;
identify, based on causing the VGT to be adjusted to the first position, a second expansion ratio associated with the VGT;
determine, based on the second expansion ratio, second wear-reduction information that indicates a second force-reduction threshold position of the VGT;
obtain second performance information indicating a second desired position of the VGT;
select, based on the second wear-reduction information and the second performance information, a second position of the VGT from the second force-reduction threshold position of the VGT and the second desired position of the VGT; and
cause the VGT to be adjusted to the second position.

2. The machine of claim 1, wherein the controller causing the VGT to be adjusted to the first position causes a first force on one or more adjustable components of the VGT to be less than or equal to a threshold force.

3. The machine of claim 2, wherein the controller causing the VGT to be adjusted to the second position causes a second force on the one or more adjustable components of the VGT to be less than or equal to the threshold force and wherein the first force and the second force are within a force-related wear-reduction operating range of the VGT.

4. The machine of claim 1, wherein the controller, to determine the first wear-reduction information, is configured to:
process the first expansion ratio to determine the first force-reduction threshold position of the VGT.

5. The machine of claim 1, wherein the controller, to determine the first wear-reduction information, is configured to:
search, based on the first expansion ratio, a lookup table to determine the first force-reduction threshold position of the VGT.

6. The machine of claim 1, wherein the controller, to select the first position of the VGT, is configured to:
select the first position of the VGT as a minimum of the first force-reduction threshold position of the VGT and the first desired position of the VGT.

7. The machine of claim 1, wherein the first force-reduction threshold position of the VGT corresponds to a force-related wear-increase operating range that includes a maximum force that is allowed to be exerted on one or more components of the VGT.

8. A controller of a machine, comprising:
one or more memories; and
one or more processors configured to:
identify a first expansion ratio associated with a variable geometry turbocharger (VGT) of the machine;
determine, based on the first expansion ratio, first wear-reduction information that indicates a first force-reduction threshold position of the VGT, the first force-reduction threshold position of the VGT being a position at a threshold of a force-related wear-increase operating range, the force-related wear-increase operating range being a range that includes forces that exceed a maximum force that is allowed to be exerted on one or more components of the VGT;
select, based on the first wear-reduction information and first performance information indicating a first desired position of the VGT, the first force-reduction threshold position of the VGT, the force-reduction threshold position of the VGT being different than the desired position of the VGT; and
cause the VGT to be adjusted to the first force-reduction threshold position;
identify a second expansion ratio associated with the VGT;
determine, based on the second expansion ratio, second wear-reduction information that indicates a second force-reduction threshold position of the VGT;
select, based on the second wear-reduction information and second performance information indicating a second desired position of the VGT, a second position of the VGT; and cause the VGT to be adjusted to the second position.

9. The controller of claim 8, wherein:
causing the VGT to be adjusted to the first force-reduction threshold position causes a first force on one or more adjustable components of the VGT to be less than or equal to a threshold force; and
causing the VGT to be adjusted to the second position causes a second force on the one or more adjustable components of the VGT to be less than or equal to the threshold force.

10. The controller of claim 8, wherein:
causing the VGT to be adjusted to the first force-reduction threshold position and causing the VGT to be adjusted to the second optimized position causes the VGT to operate within a force-related wear-reduction operating range.

11. The controller of claim 8, wherein:
causing the VGT to be adjusted to the first force-reduction threshold position and causing the VGT to be adjusted to the second position causes the VGT to not operate within the force-related wear-increase operating range.

12. The controller of claim 8, wherein the one or more processors, to determine the first wear-reduction information, are configured to:
process the first expansion ratio to determine the first force-reduction threshold position of the VGT.

13. The controller of claim 8, wherein the one or more processors, to determine the first wear-reduction information, are configured to:
search, based on the first expansion ratio, a lookup table to determine the first force-reduction threshold position of the VGT.

14. The controller of claim 8, wherein the one or more processors, to select the first force-reduction threshold position of the VGT, are configured to:
select the first force-reduction threshold position of the VGT by selecting from the first force-reduction threshold position of the VGT and the first desired position of the VGT.

15. A method, comprising:
identifying, by a controller of a machine, a first expansion ratio associated with a variable geometry turbocharger (VGT) of the machine;
determining, by the controller and based on the first expansion ratio, first wear-reduction information that indicates a first force-reduction threshold position of the VGT at a threshold of a force-related wear-increase operating range within which a maximum force is exceeded;
selecting, by the controller and based on the first wear-reduction information and first performance information indicating a first desired position of the VGT, a first position of the VGT, the first position of the VGT being selected as the first force-reduction threshold position of the VGT when the first desired position of the VGT is within the force-related wear-increase operating range; and
causing, by the controller, the VGT to be adjusted to the first position.

16. The method of claim 15, wherein causing the VGT to be adjusted to the first position causes the VGT to operate within a force-related wear-reduction operating range.

17. The method of claim 15, wherein causing the VGT to be adjusted to the first position causes the VGT to not operate within a force-related wear-increase operating range.

18. The method of claim 15, wherein selecting the first position of the VGT comprises:
selecting the first position of the VGT from the first force-reduction threshold position of the VGT and the first desired position of the VGT.

19. The method of claim 15, wherein the first position is a minimum of the first force-reduction threshold position of the VGT and the first desired position of the VGT.

20. The method of claim 15, further comprising:
identifying a second expansion ratio associated with the VGT;
determining, based on the second expansion ratio, second wear-reduction information that indicates a second force-reduction threshold position of the VGT;
selecting, based on the second wear-reduction information and second performance information indicating a second desired position of the VGT, a second position of the VGT; and
causing the VGT to be adjusted to the second position.

\* \* \* \* \*